(12) United States Patent
Gerbaulet et al.

(10) Patent No.: US 8,247,053 B2
(45) Date of Patent: Aug. 21, 2012

(54) ADHESIVE COMPOSITION CONTAINING GRAFTED POLYETHYLENE

(75) Inventors: Arnaud Gerbaulet, Oye et Pallet (FR); Samuel Devisme, Rouen (FR); Laurent Quillet, Pont-Audemer (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/147,073

(22) PCT Filed: Jan. 28, 2010

(86) PCT No.: PCT/FR2010/050136
§ 371 (c)(1),
(2), (4) Date: Sep. 12, 2011

(87) PCT Pub. No.: WO2010/086559
PCT Pub. Date: Aug. 5, 2010

(65) Prior Publication Data
US 2011/0318517 A1    Dec. 29, 2011

(30) Foreign Application Priority Data

Jan. 30, 2009    (FR) ........................... 09 50569

(51) Int. Cl.
*B29D 22/00* (2006.01)
*B29D 23/00* (2006.01)
*B32B 1/08* (2006.01)
(52) U.S. Cl. .............. 428/36.9; 428/36.91; 428/413; 428/35.7; 428/500; 428/515; 428/516; 427/202; 427/203

(58) Field of Classification Search ............ 428/36.91, 428/413, 36.9, 35.7, 500, 515, 516; 427/202, 427/203
See application file for complete search history.

(56) References Cited

U.S. PATENT DOCUMENTS

| | | | |
|---|---|---|---|
| 4,452,942 | A | 6/1984 | Shida et al. |
| 4,684,576 | A | 8/1987 | Tabor et al. |
| 5,352,739 | A | 10/1994 | Ariunan |
| 6,166,142 | A | 12/2000 | Zhang et al. |
| 6,299,985 | B1 | 10/2001 | Zhang et al. |
| 6,545,091 | B1 | 4/2003 | Lee et al. |
| 6,746,738 | B1 | 6/2004 | Le Rov et al. |
| 2009/0246533 | A1 | 10/2009 | Chauveau et al. |

*Primary Examiner* — Michael C Miggins
(74) *Attorney, Agent, or Firm* — Buchanan Ingersoll & Rooney

(57) ABSTRACT

The invention relates to an adhesive composition comprising, relative to its total weight: from 1 to 40% of a polyethylene (A) grafted with a functional monomer or a blend of a polyethylene (A1) with a second polymer (A2) different from (A1), said blend of (A1) and (A2) being co-grafted with an unsaturated functional monomer, the content by weight of unsaturated functional monomer relative to (A) being in the range from 30 to 100000 ppm; from 25 to 98% of a non-grafted polyethylene (B) having a density in the range from 0.900 to 0.965; from 1 to 35% of an elastomeric product (C). The invention also relates to a multilayer structure comprising this composition, said structure being able to serve as protection of metal tubes used for the fabrication of oil pipelines and gas pipelines.

15 Claims, 1 Drawing Sheet

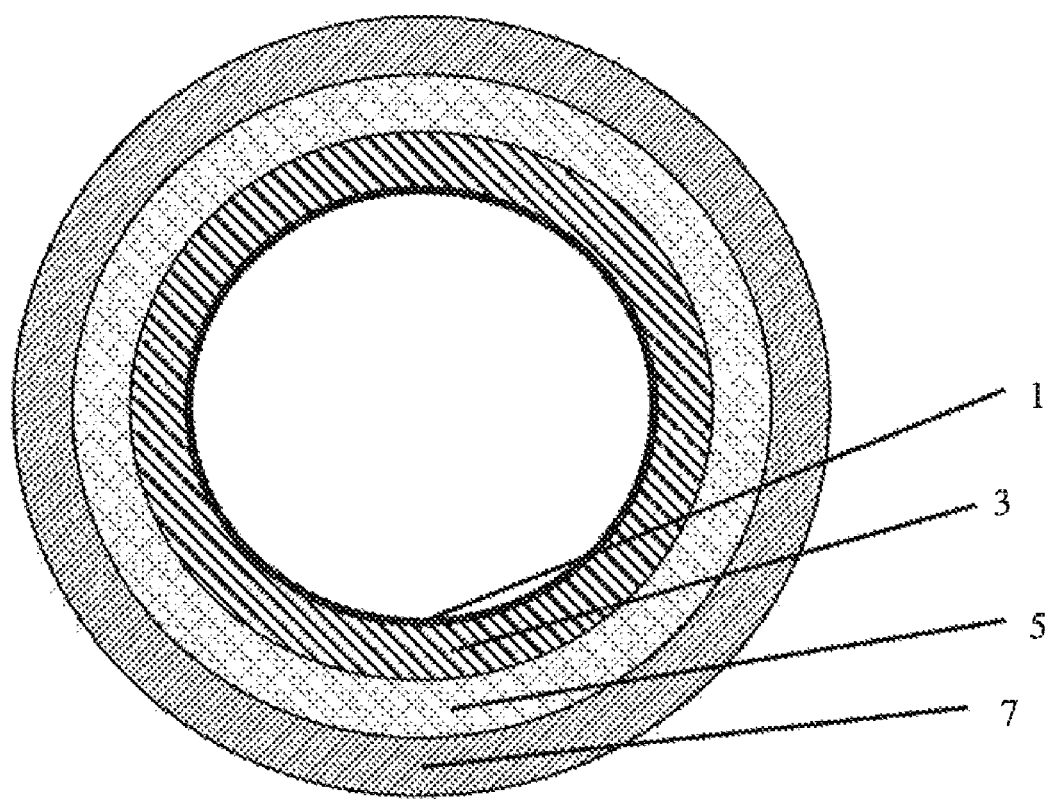

ADHESIVE COMPOSITION CONTAINING GRAFTED POLYETHYLENE

FIELD OF THE INVENTION

The present invention relates to an adhesive composition comprising grafted polyethylene. This composition makes possible the manufacture of multilayer structures that can be used as protective structures for tubes, and said tubes can be used for example for the manufacture of oil pipelines or gas pipelines.

PRIOR ART

The development of the world energy demand makes it necessary to construct new oil pipelines and gas pipelines so that oil and gas can be moved from the producing countries to the consuming countries. These oil pipelines and gas pipelines are fabricated from metal tubes that are joined together. These metal tubes are generally protected from the environment by coatings in order to prevent their corrosion, for example with a coating of a polyolefin (generally polypropylene or polyethylene). As the polyolefins do not adhere to metal, intermediate layers are generally used, which make it possible to apply the polyolefin coating. For example, it is possible to use intermediate layers of epoxy resin and of polyolefin-based adhesive composition, also called "binder" in the present description.

FIG. 1 shows an example of a hollow metal tube (1) covered with a protective multilayer structure. In FIG. 1, said protective structure is composed as follows starting from the metallic surface of the tube: a layer of epoxy resin (3), a layer of binder (5) and a layer of polyolefin (7).

For these structures to be able to be used for the construction of oil pipelines or gas pipelines, they have to be approved in each of the countries where they are to be used. Generally, approval consists of measuring the adhesion between the layer of polyolefin coating and the layer of epoxy resin, said adhesion being conferred by the presence of the binder between the two layers. The conditions for this approval can be different for each country. Depending on the country, the two layers must adhere at room temperature and/or at high temperature, i.e. Binder compositions have already been described in the prior art. For example, document WO2006125913 describes a binder comprising a blend of a polyethylene (PE) having a density between 0.94 and 0.98 with a polypropylene, said blend being co-grafted with an unsaturated functional monomer and being able to be diluted in a non-grafted polyethylene having a density between 0.94 and 0.98. This binder is used for the manufacture of tubes in the construction of oil pipelines.

This binder displays good adhesion at ambient temperature up to 80° C.

To measure this adhesion, in a first stage, after formation of the tube, a tongue is cut out with a knife or a chisel: this constitutes the "priming" stage. This tongue is cut out at the level of the binder, between the layers of epoxy resin and of polyolefin. In a second stage, the force of adhesion is measured by fixing jaws on the tongue formed during the first stage: the peel strength is measured by pulling on the tongue. In addition to good adhesion, it is therefore necessary for the tongue priming stage to be easy. For binders for which priming is not possible at room temperature, it has to be carried out after heating the tube. This heating constitutes an additional stage of manipulation. Moreover, the approval protocols in certain countries prohibit such heating, which therefore prevents these binders being used in these countries. Now, priming is not easy or is even impossible at room temperature with the binder described in this document.

Another binder composition is disclosed in document EP1043375, said binder comprising a blend of a polyethylene having a density between 0.935 and 0.980 with a polymer selected from elastomers, polyethylenes of very low density, said blend being co-grafted with an unsaturated carboxylic acid and diluted in a polyethylene with density between 0.93 and 0.95. This binder can be used to form a multilayer structure for example in flexible packaging or petrol tanks and does not relate to the metal tubes used for the fabrication of oil pipelines.

There are also compositions based on polyethylene obtained by grafted metallocene catalysis. These compositions have improved adhesive properties relative to the grafted polyethylenes obtained by radical polymerization or by catalysis of the Ziegler-Natta type, the latter being classified here under the designation "non-metallocene". The polyethylenes obtained by metallocene catalysis, which are generally ethylene polymers comprising alpha-olefin comonomers, have a narrower molecular weight distribution than the non-metallocene polyethylenes. Moreover, the distribution of the alpha-olefin comonomers within the metallocene polyethylene chain is more uniform than in the various non-metallocene polyethylene chains. Finally, the various chains of metallocene polyethylene comprise fewer branched long chains than the chains of non-metallocene polyethylene. These intrinsic properties lead to physicochemical properties of the metallocene polyethylenes, for example of fluidity in the molten state, different from those of the non-metallocene polyethylenes.

Among the documents describing an adhesive composition based on grafted metallocene polyethylene, we may mention as an example document WO 97/27259, which describes an adhesive composition comprising a non-metallocene polyethylene, from 5 to 35 wt. % of the composition of a particular grafted metallocene polyethylene and optionally up to wt. % of a hydrocarbon elastomer. However, this document does not describe an adhesive composition that remains effective at high temperature and that permits easy priming at room temperature, such as described previously. Another adhesive composition is also described in document WO 99/37730, said composition comprising a copolymer of ethylene and of an ethylenic monomer bearing a polar function of the ester type, from 5 to wt. % of the composition of a particular grafted metallocene polyethylene and optionally up to 30 wt. % of a hydrocarbon elastomer. These adhesive formulations thus comprise at least 65 wt. % of copolymer of ethylene and of an ethylenic monomer bearing a polar function of the ester type and elastomer; they exhibit low adhesiveness at high temperature, which means they cannot be used when the approval procedures demand adhesion at high temperature.

There is therefore still a need to find new binder compositions that make it possible to manufacture multilayer structures that can be used for the construction of oil pipelines or gas pipelines. More particularly, these binders must make it possible to obtain good adhesion with the layers that are bonded to it directly at room temperature as well as at high temperature, and moreover the priming for measuring this adhesion must be easy at room temperature.

SUMMARY OF THE INVENTION

The invention in fact relates to a novel composition, based on non-grafted polyethylene (B) obtained by metallocene catalysis, which makes it possible to overcome the drawbacks described above.

This composition comprises, relative to its total weight:
from 1 to 40% of a polyethylene (A) grafted with an unsaturated functional monomer or a blend of a polyethylene (A1) with a second polymer (A2) different from (A1), said blend of (A1) and (A2) being co-grafted with an unsaturated functional monomer, the content by weight of functional monomer relative to (A) being in the range from 30 to 100000 ppm;
from 25 to 98% of a non-grafted polyethylene (B) obtained by metallocene catalysis having a density in the range from 0.900 to 0.965;
from 1 to 35% of an elastomeric product (C).

This novel composition displays good adhesion at room temperature or at high temperature (for example 80° C.) with many substrates, for example substrates of polyethylene or of epoxy resin. It is generally considered that adhesion at room temperature is good when the peel strength is at least greater than 250N/cm according to standard NF A 49-710. It is generally considered that adhesion at 80° C. is good when the peel strength is at least greater than 100N/cm (NF A 49-710). The composition can be used in any type of multilayer structure. A preferred use of this composition is in pipe coating, incorporating structures that include a layer of polyethylene. The present invention is particularly useful for metallic surfaces coated with polyethylene (PE). The applicant discovered that this binder permits the formation of multilayer structures having excellent properties of adhesion between the different layers, but at low cost of manufacture. Priming of the structure is easy, especially for structures of the epoxy resin/binder/PE coating type.

Various preferred embodiments of the invention are described below; it is pointed out that these various embodiments can be combined with one another.

Advantageously, the composition according to the invention comprises, relative to its total weight, from 10 to 30 wt. % of the grafted polyethylene or of the co-grafted blend (A), from 40 to 80% of the non-grafted polyethylene (B) and from 10 to 30 wt. % of the elastomeric product (C).

The density of polyethylene (B) can advantageously be greater than or equal to 0.925, for example between 0.930 and 0.960.

Preferably, polyethylene (B) comprises at least 95 mol. % of ethylene.

Preferably, the functional monomer grafted on the polyethylene or on the co-grafted blend (A) is an unsaturated carboxylic acid or an unsaturated anhydride of said acid.

In the case when polymer (A) is a co-grafted blend, it preferably comprises from 90 to 20 parts of polyethylene (A1) and from 10 to 80 parts of polymer (A2).

Polymer (A2) is advantageously a polyolefin. This polyolefin is preferably selected from the homopolymers and the copolymers of ethylene and/or propylene. Quite preferably, polyolefin (A2) is a homopolymer or a copolymer of ethylene and of alpha-olefin different from (A1).

According to one embodiment, polymer (A) is a co-grafted blend of a metallocene polyethylene (A1) and a non-metallocene linear low-density polyethylene (A2).

Preferably, the density of (A1) is in the range from 0.860 to 0.96 g/cm$^3$. Preferably, the density of (A2) is in the range from 0.9 to 0.94 g/cm$^3$.

Preferably, the elastomeric product (C) has a flexural modulus below 100 MPa, said modulus being measured according to standard ISO 178:2001.

According to a first version of the invention, the elastomeric product (C) is selected from ethylene-alkyl(meth)acrylate copolymers or ethylene-alkyl(meth)acrylates-maleic anhydride terpolymers.

According to a second version of the invention, the elastomeric product (C) is a copolymer of ethylene with an alpha-olefin whose density is in the range from 0.860 to 0.900, such as the copolymers of ethylene and propylene, for example the ethylene-propylene rubbers comprising a diene (EPDM), the ethylene-propylene rubbers not comprising a diene (EPR) or the very low density polyethylenes (VLDPE).

According to a preferred version of the invention, the composition comprises:
from 10 to 30 wt. % of the co-grafted blend (A) of a polyethylene obtained by metallocene catalysis (A1) with a polyethylene obtained by Ziegler-Natta catalysis (A2), said blend of (A1) and (A2) being co-grafted with maleic anhydride, the content by weight of functional monomer relative to (A) being in the range from 30 to 100000 ppm;
from 40 to 80% of non-grafted metallocene polyethylene (B) having a density in the range from 0.900 to 0.965;
and from 10 to 30 wt. % of an ethylene-alkyl(meth)acrylate copolymer (C).

Another object of the invention is a film of the composition according to the invention.

The invention also relates to a multilayer structure comprising at least one layer of composition according to the invention on at least one other layer called the "substrate layer".

According to a first variant of the structure according to the invention, the substrate layer comprises a polyolefin, said polyolefin preferably being a polyethylene.

According to a second variant of the structure according to the invention, the substrate layer comprises an epoxy resin.

A preferred structure of the invention comprises a layer of the composition, said layer being between a first substrate layer comprising an epoxy resin and a second substrate layer comprising polyethylene.

The invention also relates to the use of the composition or of a structure according to the invention in tubes, in particular for the corrosion protection of metal tubes.

The invention also relates to a tube covered with the structure according to the invention. This tube is preferably metallic. Quite preferably, the tube is covered with a protective multilayer structure comprising an epoxy resin, a layer of binder according to the invention and a layer of polyolefin coating, said layers being stated in the order from the inside to the outside of the tube.

The tube according to the invention can advantageously be used for conveying gases or liquids, quite particularly petroleum products or gases.

Other advantages will become clear on reading the description given below.

DESCRIPTION OF THE APPENDED DRAWINGS

The following description is given solely for purposes of illustration and is non-limiting, referring to the appended drawings, in which FIG. 1, already described, is a sectional view showing an example of tube (1) covered with a protective structure, said protective structure being composed successively of a layer of epoxy resin (3), of binder (5) and of polyolefin (7).

DETAILED DESCRIPTION OF THE INVENTION

The composition according to the invention comprises, relative to its total weight:
from 1 to 40% of a polyethylene (A) grafted with a functional monomer or a blend of a polyethylene (A1) with a second polymer (A2) different from (A1), said blend of (A1) and (A2) being co-grafted with a functional monomer, the content by weight of functional monomer relative to (A) being in the range from 30 to 100000 ppm;

from 25 to 98% of a non-grafted polyethylene (B) obtained by metallocene catalysis having a density in the range from 0.900 to 0.965;

from 1 to 35% of an elastomeric product (C).

The polyethylene (PE) (A) or (A1) can be a homopolymer of ethylene or a copolymer comprising at least 50 mol. % of ethylene and of a second alpha-olefin. Preferably, the number of moles of ethylene is greater than 90%, quite preferably greater than 95%. In the present description, copolymer means a polymer obtained by copolymerization of at least two different co-monomers.

1-Butene, 1-hexene, 1-octene or 1-decene can be used advantageously as second alpha-olefin capable of copolymerizing with ethylene.

The density of the PE (A) or (A1) measured according to standard ASTM D 1505 can be from 0.860 to 0.96, advantageously from 0.900 to 0.940, for example from 0.910 to 0.935.

Quite preferably, polyethylene (A) or (A1) is a linear low-density polyethylene (LLDPE): this polymer is in a substantially linear form with a small number of long chains. "Long chain" means a chain produced during polymerization of the ethylene and not those optionally introduced by the second alpha-olefin having co-polymerized with the ethylene. According to the invention, the number of long chains is considered to be low when its average number is less than or equal to 0.01 for a number of carbon atoms of 100, preferably less than or equal to 0.005.

The number of carbon chains can be measured using nuclear magnetic resonance according to the quantitative spectroscopic method described by Randall in Rev. Macromol. Chem. Phys., C29, pages 285-297.

This LLDPE can be obtained catalytically, using catalysts of the Phillips, Ziegler-Natta or metallocene type.

According to one embodiment, the LLDPE is a metallocene polyethylene. In this application, metallocene polyethylene denotes PE manufactured in the presence of a single-site catalyst generally constituted of an atom of a metal which can for example be zirconium or titanium and of two cyclic alkyl molecules bound to the metal. More specifically, the metallocene catalysts are usually composed of two cyclopentadiene rings bound to the metal. These catalysts are often used with aluminium oxanes as cocatalysts or activators, preferably methyl aluminium oxane (MAO). Hafnium can also be used as metal to which the cyclopentadiene is fixed. Other metallocenes can include transition metals of groups IV A, V A, and VI A. Metals of the lanthanide series can also be used.

According to the invention, the PE (A) or (A1) can be a polyethylene obtained by metallocene catalysis. This polyethylene obtained by metallocene catalysis is advantageously characterized by its ratio $\overline{Mw}/\overline{Mn}<3$ and preferably <2 in which $\overline{Mw}$ and $\overline{Mn}$ denote the weight-average molecular weight and the number-average molecular weight, respectively. Alternatively, it can also have an MFR (melt flow ratio) or melt flow index (MFI) below 6.53 and an Mw/Mn ratio greater than MFR minus 4.63. MFR denotes the ratio of MFI10 (MFI at 190° C. under a load of 10 kg) to MFI2 (MFI at 190° C. under a load of 2.16 kg). Other metallocene polyethylenes are defined by an MFR greater than or equal to 6.13 and an Mw/Mn ratio less than or equal to MFR minus 4.63.

According to the invention, the ratio of the weight-average and number-average molecular weights can be measured for example by gel permeation chromatography (GPC) after dissolving the polymer in tetrahydrofuran.

In the case when a blend of a polyethylene (A1) with a second polymer (A2) is used, (A2) is different from (A1). Advantageously, polymer (A2) is a polyolefin. The polyolefin is preferably selected from the homopolymers of ethylene or the copolymers of ethylene and another olefin, for example 1-butene, 1-hexene, 1-octene or 1-decene. Preferably, polymer (A2) is a polyethylene and quite preferably a linear low-density polyethylene. Preferably, the LLDPE is obtained by Ziegler-Natta catalysis.

The "Ziegler-Natta" catalysts are generally constituted of a halogenated compound of a transition metal of groups 4 or 5, for example titanium or vanadium, and of an alkylated compound of a metal of groups 2, 12, 13, for example beryllium, magnesium, zinc or aluminium. As an example, we may mention the combination of $TiCl_4$ with $Al(C_2H_5)_3$.

Preferably, the PE (A2) is characterized by a ratio $\overline{Mw}/\overline{Mn}>3$.

The density of (A2) can be in the range from 0.9 to 0.94, for example from 0.905 to 0.925.

According to an especially preferred variant of the invention, (A) is a blend of a polyethylene (A1) obtained by metallocene catalysis and of a non-metallocene polyethylene (A2). According to this variant, polyethylene (A2) is preferably an LLDPE. Polyethylene (A2) can be obtained by Ziegler-Natta catalysis.

Polyethylene (A) or the blend of polyethylene (A1) and of polymer (A2) is (co-)grafted with an unsaturated functional monomer.

Preferably, the unsaturated functional monomer is a monomer selected from:
the unsaturated carboxylic acids and salts thereof, preferably those having from 2 to 30 carbon atoms, for example acrylic acid or methacrylic acid and the salts of said acids;
the carboxylic acid anhydrides, preferably those having from 4 to 30 carbon atoms: they can be selected for example from the maleic, itacanic, citraconic, allylsuccinic, cyclohex-4-ene-1,2-dicarboxylic, 4-methylenecyclohex-4-ene-1,2-dicarboxylic, bicyclo(2,2,1)hept-5-ene-2,3-dicarboxylic, and x-methylbicyclo(2,2,1)hept-5-ene-2,2-dicarboxylic anhydrides.

Preferably, maleic anhydride is used as unsaturated functional monomer. The amount by weight of (A) is in the range from 1 to 40% relative to the total weight of the composition, advantageously between 5 and 40%, preferably from 10 to 35%, or even from 10 to 30%.

The grafting reaction can then be carried out according to a batch method in solution or, preferably, according to a continuous method with a melt mixing tool, which are techniques that are well known by a person skilled in the art. In the case of a method of continuous grafting, a tool for extruding plastics in the molten state, known by a person skilled in the art, is used. As examples, we may mention internal mixers, roller mixers, single-screw extruders, counter-rotating or co-rotating twin-screw extruders, continuous co-kneaders. The grafting tool can be one of the tools mentioned above or a combination thereof, for example a co-kneader combined with a single-screw extruder, a co-rotating twin-screw extruder combined with a pump. In the case of extrusion, the tool preferably comprises a polymer melting zone, a zone for mixing and reaction between the species present and a holding/degassing zone for removing volatile compounds. The tool can be equipped with a filtration system and/or a system for rod granulation or granulation under water. Polyethylene (A) or the blend of polyethylene (A1) and polymer (A2) is fed, in the presence of a radical generator and the functional monomer, into the tool, the body temperature of which is controlled, said temperature being selected to match the kinetics of decomposition of the radical generator. It is preferred to use, as radical generator for continuous grafting, the classes of dialkyl peroxides, hydroperoxides or peroxyketals. Preferably, a temperature in the range from 100 to 300° C., more preferably from 180 to 250° C., is used.

The polyethylene, the grafting monomer and the radical generator can be fed simultaneously or separately into the extrusion tool. In particular, the monomer and/or the radical generator can be fed simultaneously with the polymer as the main feed, or separately by liquid injection along the tool.

In the injection stage, the monomer and/or the radical generator can be combined with a fraction of a solvent of the polymer. This fraction of solvent has the purpose of facilitating mixing of the reactive species as well as removal of the volatile compounds during the degassing stage.

In the holding/degassing stage, vacuum is applied suitable for devolatilization of the volatile compounds, and the level of vacuum can range from a few millibars to several hundred.

The grafted polymer can be recovered at the discharge end of the extrusion tool in the form of granules by means of a granulating tool.

In the polymer modified by grafting, the amount of monomer grafted on polymer (A) can be selected appropriately, generally in the range from 30 to 100000 ppm, preferably from 600 to 50000 ppm, relative to the total weight of the grafted polymer. The amount of monomer grafted on polymer (A) is found by determination of the succinic functions by Fourier-transform infrared spectroscopy.

The non-grafted polyethylene (B) is a polyethylene having a density in the range from 0.900 to 0.965, i.e. it can be a low-density polyethylene, an LLDPE, a medium-density polyethylene or a high-density polyethylene. This polyethylene (B) can be selected from the homopolymers of ethylene or the copolymers of ethylene and another olefin, for example 1-butene, 1-hexene, 1-octene or 1-decene. The density of the PE (B) is advantageously in the range from 0.900 to 0.960. It can be greater than 0.925, preferably between 0.925 and 0.960, for example between 0.930 and 0.940. The PE (B) is obtained by metallocene catalysis. A metallocene polyethylene can advantageously be characterized by a ratio $\overline{Mw}/\overline{Mn} < 3$ and preferably $<2$ in which $\overline{Mw}$ and $\overline{Mn}$ denote the weight-average molecular weight and the number-average molecular weight, respectively. "Metallocene polyethylene" also denotes a polyethylene having an MFR (melt flow ratio) or MFI (melt flow index) below 6.53 and an Mw/Mn ratio greater than MFR minus 4.63. MFR denotes the ratio of $MFI_{10}$ (MFI at 190° C. under a load of 10 kg) to $MFI_2$ (MFI at 190° C. under a load of 2.16 kg). Other metallocene polyethylenes are defined by an MFR greater than or equal to 6.13 and an Mw/Mn ratio less than or equal to MFR minus 4.63.

The amount by weight of (B) relative to the total weight of the composition is in the range from 25 to 98%, preferably from 40 to 80%.

Advantageously, the non-grafted polyethylene (B) comprises at least 90 mol. % of ethylene, preferably at least 95 mol. % of ethylene.

The elastomeric product (C) is different from (A) and (B).

The elastomeric product (C) can have a flexural modulus less than or equal to 1001 MPa, preferably less than or equal to 80 MPa, quite preferably less than or equal to 40 MPa, said modulus being measured according to standard ISO 178: 2001. This flexural modulus can also be greater than 1 MPa.

As examples of elastomeric product (C), we may mention the polymers selected from:
ethylene-alpha-olefin copolymers whose density is in the range from 0.860 to 0.90 such as ethylene-propylene copolymers selected from EPR (abbreviation of ethylene-propylene rubber) and EPDM (abbreviation of ethylene-propylene-diene monomer), and very low density polyethylenes (VLDPE), which are generally ethylene-butene-1, ethylene-hexene-1, ethylene-octene-1 copolymers;
ethylene-alkyl(meth)acrylate copolymers or ethylene-alkyl(meth)acrylates-maleic anhydride copolymers;
copolymers of ethylene and vinyl ester of a carboxylic acid, such as ethylene-vinyl acetate copolymer;
styrene/ethylene-butene/styrene (SEBS), styrene/butadiene/styrene (SBS), styrene/isoprene/styrene (SIS), styrene/ethylene-propylene/styrene (SEPS) block copolymers or styrene-butadiene random (SBR) copolymers;
polyisoprenes;
polybutadienes.

The amount by weight of (C) relative to the total weight of the composition is in the range from 1 to 35%, preferably from 10 to 30%.

According to one embodiment, the composition comprises, relative to its total weight, between 5 and 40% (upper and lower limits excluded) by weight of the grafted polyethylene or of the co-grafted blend (A), from 30 to 75% of the non-grafted polyethylene (B) and from 10 to 30 wt. % of product (C).

According to another embodiment, the composition comprises, relative to its total weight, from 10 to 30 wt. % of the grafted polyethylene or of the co-grafted blend (A), from 40 to 80% of the non-grafted polyethylene (B) and from 10 to 30 wt. % of product (C). Preferably, the composition comprises, relative to its total weight, from 12 to 25 wt. % of the grafted polyethylene or of the co-grafted blend (A), from 50 to 76% of the non-grafted polyethylene (B) and from 12 to 25 wt. % of product (C).

The compositions according to the invention can be prepared by the known techniques for production of thermoplastics, for example by kneading or extrusion.

The binder of the invention can optionally comprise various additives such as antioxidants, ultraviolet absorbers, antistatic agents, nucleating agents, fillers, lubricants and fireproofing products.

Examples of ultraviolet absorbers are 2,4-dihydroxybenzophenone, 2-(2'-hydroxy-3',5'-di-t-butylphenyl)-5-chlorobenzotriazole, 2-(2-hydroxy-3-t-butyl-5-methylphenyl)-5-chlorobenzotriazole, and bis(2,2',6,6')-tetramethyl-4-piperidine) sebacate.

Examples of antioxidants are 2,6-di-t-butyl-p-cresol, O-t-butyl-p-cresol, tetrakis-[methylene-3-(3,5-di-t-butyl-4-hydroxyphenyl) propionate]methane, p-naphthylamine, and para-phenylenediamine.

Examples of antistatic agents are lauryl diethanolamine, palmityl diethanolamine, stearyl diethanolamine, oleyl diethanolamine, behenyl diethanolamine, polyoxyethylene-alkylamines, stearyl-monoglyceride, and 2-hydroxy-4-n-octoxybenzophenone.

Examples of nucleating agents are p-tert-butyl aluminium benzoate, dibenzylidene-sorbitol and hydroxy-di-p-t-butyl aluminium benzoate.

Fillers that can be used are for example glass fibres, carbon fibres, talc, clay, silica, calcium carbonate, barium sulphate, magnesium hydroxide, calcium hydroxide and calcium oxide. The function of the lubricant is to facilitate the manufacture of the composition, in particular its extrusion.

Examples of lubricants are stearamide, olcamide, erucinamide, calcium stearate, zinc stearate, aluminium stearate, magnesium stearate, and polyethylene wax.

Examples of fireproofing products are metal hydroxides, halogenated agents, antimony oxide, decabromobiphenyl ether, and bis(3,5-dibromo-4-bromopropyloxyphenyl)sulphone. The amounts of these other additives can be selected from suitable amounts that do not have an adverse effect on the binders of the invention. For example, relative to the total weight of the composition, the suitable amounts are about 0.01 to 5 wt % for the antioxidants; about 0.01 to 5 wt. % for the ultraviolet absorbers; about 0.01 to 1 wt. % for the antistatic agents; about 0.01 to 5 wt. % for the nucleating agents; about 0.1 to 60 wt. % for the fillers; about 0.01 to 1 wt. % for the lubricants; and about 0.1 to 50 wt. % for the fireproofing products.

The composition according to the invention can be obtained by mixing the various polyolefins with the optional additives using the known techniques for mixing thermoplastic materials, for example extrusion or kneading. Internal mixers with blades or rotors, an external mixer, single-screw extruders, or co-rotating or counter-rotating twin-screw extruders can be used. Preferably, the temperature of the tool employed is in the range from 90 to 250° C., quite preferably between 120° C. and 200° C.

Advantageously, the final composition has an MFI in the range from 1 to 10 g/10 min (190° C., 2.16 kg).

Films can be made from the binder composition by the known techniques for manufacture of film, for example flat die extrusion (also called "extrusion cast") or blown-bubble extrusion. Preferably, the film has a thickness in the range from 0.05 mm to 2 mm.

The invention relates to a multilayer structure comprising a layer of the composition according to the invention on at least one substrate layer; the layers in direct contact with the layer of the composition according to the invention are called "substrate layer".

The layer of the composition preferably has a thickness in the range from 0.05 mm to 2 mm.

According to one embodiment, the layer of the composition according to the invention is in contact with a substrate layer comprising an epoxy resin. Before application, this epoxy resin can be in the form of powder. Preferably this layer has a thickness in the range from 0.1 to 10 mm.

According to another embodiment, the layer of the composition according to the invention is in contact with a substrate layer comprising a polyolefin. Advantageously, the polyolefin is a polyethylene. Preferably, the polyethylene has a density greater than or equal to 0.92, preferably in the range from 0.92 to 0.97, quite preferably from 0.94 to 0.97.

A structure that is particularly preferred combines these last two embodiments, i.e. it is a structure comprising successively a first substrate layer comprising an epoxy resin, a layer of composition according to the invention and a layer comprising a polyolefin, preferably polyethylene. Preferably this layer has a thickness in the range from 1 to 50 mm.

These structures can be used for corrosion protection of metal tubes or for the fabrication of gas pipelines or oil pipelines.

Another object of the invention is a tube comprising the structure according to the invention. The tube is preferably made of metal. Quite preferably, the tube according to the invention comprises the following successive layers: layer of metal/layer comprising an epoxy resin/layer of binder according to the invention/protective layer comprising polyethylene, said layers being stated in the order from the inside to the outside of the tube. Techniques known by a person skilled in the art can be used for making the tubes according to the invention. For example, the techniques of co-extrusion can be used. When the centre of the tube is of metal, we can for example use this preferred method of manufacture of the tube:

heat the metal tube, for example in the range from 150 to 250° C.;

apply the composition comprising the epoxy resin in the form of powder on the tube; the epoxy resin is then transformed to the molten state;

secondly, apply a film of the binder composition on the epoxy resin in the molten state;

thirdly, cover the molten film of the binder composition with the composition comprising polyethylene in the molten state.

The tube according to the invention can advantageously be used for conveying gases or liquids, quite particularly petroleum products or gases.

The present invention will now be illustrated with particular examples of implementation described below. It is pointed out that these examples are not intended in any way to limit the scope of the present invention.

EXAMPLES

The following products were used for preparing the examples of the composition according to the invention and for evaluating its advantages relative to the compositions of the prior art:

Co-Grafted Blend (A): Preparation

The polymers comprised in (A) are a blend of LLDPE obtained by metallocene catalysis (A1) having a density of 0.934 with LLDPE obtained by Ziegler-Natta catalysis (A2) having a density of 0.920, in a weight ratio of 70/30 respectively. The following protocol was adopted for producing the blend of co-grafted polymer:

Firstly, (A1) and (A2) are mixed in a bag. This mixture is then fed into a co-rotating extruder comprising 8 heating zones and having the following temperature profile (from the feed hopper to the extruder head): 190° C./190° C./210° C./240° C./250° C./250° C./230° C./230° C. Maleic anhydride (1.5 wt. % relative to the weight of the polymers introduced) and a radical initiator based on 2,5-di(t-butylperoxy)-2,5-dimethyl hexane (Luperox® 101) are led into the second zone. The blend co-grafted with maleic anhydride is obtained at the extruder discharge.

Non-Grafted Polyethylene (B)

mPE M 3427 is a polyethylene produced by Total Petrochemicals obtained by metallocene catalysis having a density of 0.934 and an MFI of 2.7 g/10 min (ASTM D1238, 2.16 kg, 190° C.).

Elastomeric Compound (C)

ENGAGE® EG 8200G is a very low density polyethylene produced by DOW having a flexural modulus of 28 MPa (ISO 178:2001) and a density of 0.882.

LOTRYL® 30BA02 is an ethylene-butyl acrylate copolymer produced by Arkema having a flexural modulus of 9 MPa (ISO 178:2001).

The compositions according to the invention (EX1, EX2 and EX3) and the comparative compositions (CP1 and CP2) together with their proportions by weight are shown in Table 1:

TABLE I

|  | EX1 | EX2 | CP1 | CP2 |
|---|---|---|---|---|
| CO-GRAFT (A) | 25 | 25 | 25 | 80 |
| mPE M 3427 | 55 | 55 | 75 |  |
| ENGAGE ® EG 8200G |  | 20 |  |  |
| LOTRYL ® 30BA02 | 20 |  |  | 20 |

A comparative example 3 (CP3) was also carried out by co-grafting a mixture of 80% of mPE M 3427 and 20% LOTRYL® 30BA02 in the same conditions as for the manufacture of the co-grafted blend (A).

For making films from the formulations according to the invention and the comparative formulations, firstly the various constituents (A), (B) and/or (C) of the formulation are mixed in a bag. Then this mixture of the constituents is fed into a co-rotating extruder comprising 8 heating zones and having the following temperature profile (from the feed hopper to the extruder head): 190° C./190° C./210° C./240° C./250° C./250° C./230° C./230° C. The speed of rotation of the screw is set at 250 revolutions per minute for a flow rate of 20 kg/h. At extruder outlet there is a flat die for forming a film from the composition.

A steel tube is heated to 195° C. An epoxy resin (Eurocote 714.4) is applied on this tube by spraying. The resin, which assumes the form of a gel, is covered 25 seconds later by rolling the extruded film of the adhesive composition previously obtained. A 3 mm thick layer of high-density polyethylene 4206B (Total Petrochemicals) is applied immediately by rolling on the binder, which is still in the molten state.

The tube is then cooled with water to room temperature.

The results relating to adhesion are presented in Table 2. To measure the adhesion of the epoxy resin and of the layer of PE, in a first stage priming is effected by detaching a tongue using a knife at room temperature; the term "OK" is shown in the "RT priming" line of Table 2 when priming at room temperature is possible: If priming is not possible at room temperature, the tube is heated first, before detaching the tongue; the term "Fail" is shown in the "RT priming" line of Table 2 when priming at room temperature is not possible.

Once the tongue is detached, the test specimen is put in a controlled heating chamber and the protocol of standard NF A 49-710 is applied for measuring the peel strength. The tests are carried out at 23° C. and 80° C.; the results obtained are also shown in Table 2.

TABLE 2

|  | EX1 | EX2 | CP1 | CP2 | CP3 |
|---|---|---|---|---|---|
| RT priming | OK | OK | Fail | OK | OK |
| Peel strength 23° C. | 371 | 295 | 271 | 159 | 180 |
| Peel strength 80° C. | 169 | 124 | 160 | Not measured | 70 |

The binders according to the invention have excellent adhesion both at room temperature and at high temperature. EX1 and CP2 show that adhesion is improved at room temperature, when a proportion of grafted polymer (A) is replaced with a non-grafted polyethylene (B), in the proportions of the composition according to the invention.

The invention claimed is:

1. Composition comprising, relative to its total weight:
   from 1 to 40% of a polyethylene (A) grafted with a functional monomer or a blend of a polyethylene (A1) with a second polymer (A2) different from (A1), said blend of (A1) and (A2) being co-grafted with an unsaturated functional monomer, the content by weight of unsaturated functional monomer relative to (A) being in the range from 30 to 100000 ppm;
   from 25 to 98% of a non-grafted polyethylene (B) obtained by metallocene catalysis having a density in the range from 0.900 to 0.965;
   from 1 to 35% of an elastomeric product (C).

2. Composition according to claim 1, wherein said composition comprises, relative to its total weight, from 10 to 30 wt. % of the grafted polyethylene or of the co-grafted blend (A), from 40 to 80% of the non-grafted polyethylene (B) and from 10 to 30 wt. % of the elastomeric product (C).

3. Composition according to claim 1, in which the density of polyethylene (B) is greater than or equal to 0.925.

4. Composition according to claim 1, in which the density of polyethylene (B) is between 0.930 and 0.960.

5. Composition according to claim 1, in which the functional monomer grafted on the polyethylene or on the mixture (A) is an unsaturated carboxylic acid or an unsaturated anhydride of said acid.

6. Composition according to claim 1, in which (C) has a flexural modulus below 100 MPa, said modulus being measured according to standard ISO 178:2001.

7. Composition according to claim 1, in which (C) is selected from the ethylene—alkyl (meth)acrylate copolymers or ethylene alkyl (meth)acrylates—maleic anhydride terpolymers.

8. Composition according to claim 1, in which (C) is a copolymer of ethylene with an alpha-olefin whose density is in the range from 0.860 to 0.90.

9. The composition according to claim 1 comprising a tube.

10. Composition according to claim 1, in which (A2) is a polyolefin.

11. Composition according to claim 10, in which polyolefin (A2) is a polyethylene different from (A1).

12. Composition according to claim 11, wherein (A) is a co-grafted blend of (A1) and (A2) and in that this blend comprises from 80 to 20 parts of a polyethylene obtained by metallocene catalysis (A1) with a density in the range from 0.865 to 0.950 and from 20 to 80 parts of a linear low-density polyethylene (A2) obtained by Ziegler-Natta catalysis having a density in the range from 0.900 to 0.940 g/cm$^3$.

13. Multilayer structure comprising at least one layer of composition (5) according to claim 1 on at least one other layer, said other layer(s) referred to as a "substrate layer" (3, 7).

14. Structure according to claim 13, in which the layer of composition (5) is interposed between a first substrate layer comprising an epoxy resin (3) and a second substrate layer comprising polyethylene (7).

15. A process for the corrosion protection of metal tubes comprising in order the steps of applying a powder composition containing an epoxy resin to a heated metal tube—said epoxy resin powder melts into the molten state from the heat of the metal tube, applying the composition of claim 1 in the molten state as a binder to said epoxy-coated metal tube, then covering the molten film of the binder composition with a polyethylene composition in the molten state.

* * * * *